No. 637,188. Patented Nov. 14, 1899.
F. WAYLAND.
CIDER MILL.
(Application filed Jan. 16, 1899.)
(No Model.)
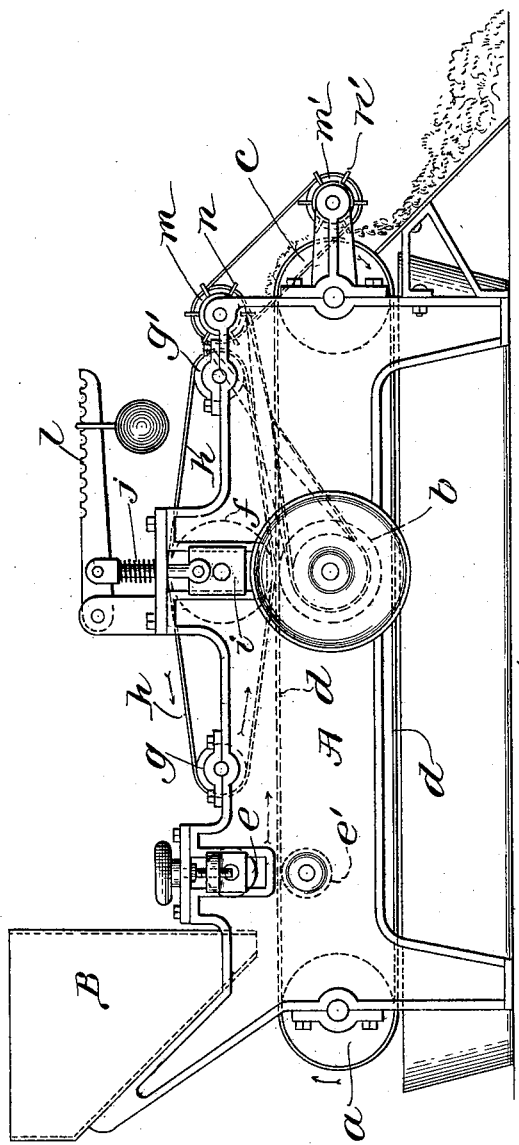
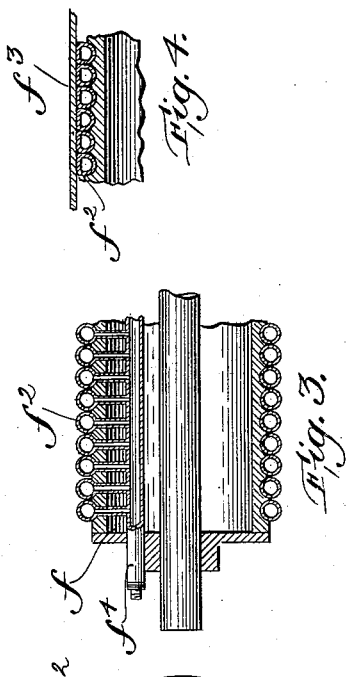
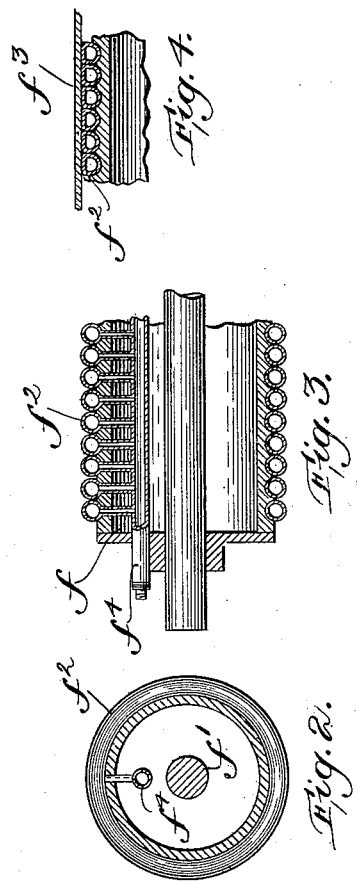
Witnesses:
Roy H. Hill.
Annie J. Dailey.
Inventor
Frank Wayland
by Crossley & Goddard.
Attorneys.
THE NORRIS PETERS CO., PHOTO-LITHO., WASHINGTON, D. C.

UNITED STATES PATENT OFFICE.

FRANK WAYLAND, OF NEWTON, MASSACHUSETTS.

CIDER-MILL.

SPECIFICATION forming part of Letters Patent No. 637,188, dated November 14, 1899.

Application filed January 16, 1899. Serial No. 702,225. (No model.)

*To all whom it may concern:*

Be it known that I, FRANK WAYLAND, of Newton, in the county of Middlesex and State of Massachusetts, have invented certain new and useful Improvements in Cider-Mills, of which the following is a description sufficiently full, clear, and exact to enable those skilled in the art to which it appertains or with which it is most nearly connected to make and use the same.

My invention comprises certain improvements in cider-mills and is intended to provide a machine that shall be capable of completely extracting the juice from the apples, besides accomplishing the same in the most satisfactory and expeditious manner.

To this end my invention comprises such an arrangement of aprons and rolls as will subject the cheese or mass of ground or cut apples to a gradually-increasing pressure until the juice is completely expressed therefrom; and it consists in the utilization of a cylindrical pressure-roll having a yielding air-cushioned surface, so that the pulp is not squeezed into and mingled with the juice pressed out.

In the accompanying drawings I have shown one of the forms in which I may embody my invention.

Figure 1 is a side elevation of the complete machine. Fig. 2 is a cross-sectional view of the yielding pressure-roll. Fig. 3 is a longitudinal sectional view thereof. Fig. 4 is a partial detail also in longitudinal section.

A designates the framework of the machine, in which are journaled the rolls $a, b$, and $c$, around which passes an endless apron $d$.

B designates a feed-chute through which the ground apples are fed to the apron.

A roll $e$ is placed above the apron and is preferably adjustable to and from the same by any suitable means, such as sliding boxes and adjusting-screws. Beneath the said apron and opposite to said adjusting-roll is a fixed roll $e'$.

A roll $f$, having a yielding air-cushioned surface, is mounted in suitable bearings above the roll $b$, with which it coöperates. Around this roll $f$ and upon the rollers $g$ $g'$ an endless apron $h$ is made to travel. The roll $g$ is situated some little distance above the apron $d$ and passes between the pressure-roll $f$ and the bed-roll $b$, thus causing the two aprons to converge as they approach the pressure or squeezing rolls. The roll $f$ comprises a cylinder-frame $f'$, upon which pneumatic tubes $f^2$ are closely arranged side by side. In order to afford a smooth level surface a peripheral band $f^3$ may pass around and rest upon said pneumatic tubes. A supply-pipe $f^4$ affords means for inflating or deflating the pneumatic tubes, as desired. While I have shown all of these tubes communicating with a single conduit or pipe, it will be understood that independent pipes for supplying the several tubes may be used, if desired.

The roll $f$ is journaled in sliding boxes or bearings $i$. Springs $j$ may be arranged in any suitable manner to lift said roll, and a weighted lever $l$ or equivalent means may be employed for varying the pressure exerted upon said roll.

I may also employ suitable doffing-rolls or clearers to scrape or clear off the pressed pulp from the aprons. In the drawings I have shown a pair of rolls $m$ $m'$, provided with blades $n$ $n'$ for this purpose.

The operation of my device is as follows: The ground apples are fed to the apron by means of the chute B. The leveling-roll $e$ serves to separate the ground apples evenly to any desired depth. The pulp is then carried by the apron $d$ to the squeezing-rolls $f$ $b$. Inasmuch as the two aprons converge as they approach the squeezing-rolls a gentle and continuously-increasing pressure is exerted upon the pulp without causing the pulp to be ground into the apron and also tends to compact the mass for action by the pressure-roll. The pressure-roll $f$, having its pressure regulated to any desired extent, then squeezes the mass of pulp gently, but effectively, until the juice is expressed therefrom. In case a whole apple or any foreign body, like a stone, should fall upon the apron no harm is done, since the pressure-roll $f$ is mounted in yielding bearings. The yielding surface of the roll $f$ prevents the crushing of the pulp to such an extent as to cause it to mingle with the juice extracted, which is likely to happen if a hard-surface roll is used. The pulp then passes from the rolls to the rear end of the machine, where it is allowed to drop off or is scraped off by means of the scrapers or clearers $m$ $m'$.

With a mill of this kind I am enabled to produce a fine quality of cider, as the cheese or pulp is rapidly supplied to the squeezing action of the rolls and does not spoil by reason of having to stand a long time until the juice is completely extracted from the pulp.

Having thus explained the nature of the invention and described a way of constructing and using the same, though without attempting to set forth all of the forms in which it may be made or all of the modes of its use, it is declared that what is claimed is—

1. In a cider-mill the combination of a bed-roll and a coöperating pressure-roll formed with a series of pneumatic tubes arranged side by side about its periphery, a flexible band or apron resting upon said tubes so as to afford an even level surface and means for pressing said roll normally against the bed-roll, substantially as described.

2. In a cider-mill, the combination of the bed-roll, the coöperating cylindrical pressure-roll having a level yielding air-cushioned surface, said roll being normally pressed against the bed-roll, and means for feeding the pulp to the coöperating rolls, substantially as described.

In testimony whereof I have signed my name to this specification, in the presence of two subscribing witnesses, this 14th day of January, A. D. 1899.

FRANK WAYLAND.

Witnesses:
GEO. N. GODDARD,
ANNIE J. DAILEY.